US007340525B1

(12) United States Patent
Bhatia et al.

(10) Patent No.: US 7,340,525 B1
(45) Date of Patent: Mar. 4, 2008

(54) METHOD AND APPARATUS FOR SINGLE SIGN-ON IN A WIRELESS ENVIRONMENT

(75) Inventors: Gaurav Bhatia, Foster City, CA (US); Kamalendu Biswas, Foster City, CA (US); Arun Swaminathan, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 617 days.

(21) Appl. No.: 10/351,073

(22) Filed: Jan. 24, 2003

(51) Int. Cl.
*G06F 15/16* (2006.01)

(52) U.S. Cl. .................................. 709/229

(58) Field of Classification Search .............. None
See application file for complete search history.

(56) References Cited

U.S. PATENT DOCUMENTS

| | | | | |
|---|---|---|---|---|
| 5,138,712 A * | 8/1992 | Corbin | ................ | 726/30 |
| 5,682,478 A * | 10/1997 | Watson et al. | ................ | 709/229 |
| 5,805,803 A * | 9/1998 | Birrell et al. | ................ | 726/12 |
| 5,812,784 A * | 9/1998 | Watson et al. | ................ | 709/227 |
| 6,226,752 B1 * | 5/2001 | Gupta et al. | ................ | 726/9 |
| 6,360,254 B1 * | 3/2002 | Linden et al. | ................ | 709/219 |
| 6,374,402 B1 * | 4/2002 | Schmeidler et al. | ........ | 717/167 |
| 6,668,322 B1 * | 12/2003 | Wood et al. | ................ | 713/182 |
| 6,691,232 B1 * | 2/2004 | Wood et al. | ................ | 726/6 |
| 6,763,370 B1 * | 7/2004 | Schmeidler et al. | ........ | 709/203 |
| 6,763,468 B2 * | 7/2004 | Gupta et al. | ................ | 726/2 |
| 6,865,605 B1 * | 3/2005 | Soderberg et al. | .......... | 709/226 |
| 6,892,307 B1 * | 5/2005 | Wood et al. | ................ | 726/8 |
| 6,898,711 B1 * | 5/2005 | Bauman et al. | ............ | 713/185 |
| 6,993,596 B2 * | 1/2006 | Hinton et al. | ............... | 709/250 |
| 7,249,176 B1 * | 7/2007 | Salas et al. | ................ | 709/225 |
| 2002/0138728 A1 * | 9/2002 | Parfenov et al. | ............ | 713/170 |
| 2003/0005118 A1 * | 1/2003 | Willimas | .................... | 709/225 |
| 2003/0018808 A1 * | 1/2003 | Brouk et al. | ................ | 709/238 |
| 2003/0041178 A1 * | 2/2003 | Brouk et al. | ................ | 709/313 |
| 2003/0041240 A1 * | 2/2003 | Roskind et al. | ............ | 713/168 |
| 2003/0149900 A1 * | 8/2003 | Glassman et al. | .......... | 713/202 |
| 2003/0182242 A1 * | 9/2003 | Scott et al. | .................. | 705/65 |
| 2004/0064719 A1 * | 4/2004 | de Jong et al. | ............ | 713/200 |

* cited by examiner

*Primary Examiner*—Jason Cardone
*Assistant Examiner*—Thomas Duong
(74) *Attorney, Agent, or Firm*—Park, Vaughen & Fleming LLP; Edward Grundler

(57) ABSTRACT

One embodiment of the present invention provides a system that facilitates single sign-on services in a wireless environment. The system operates by receiving a request at an application server from a wireless gateway to access a partner application on behalf of a user. The system then determines if the wireless gateway holds a token granting access to the partner application on behalf of the user. If the wireless gateway does not hold the token, the system redirects the request to a single sign-on server. The single sign-on server then requests user authentication credentials from the user through the wireless gateway. After receiving the user authentication credentials, the system determines if the user is authorized to access the partner application. If so, the single sign-on server issues a token to the wireless gateway. This token grants wireless gateway access to the partner application on behalf of the user.

21 Claims, 3 Drawing Sheets

METHOD AND APPARATUS FOR SINGLE SIGN-ON IN A WIRELESS ENVIRONMENT

BACKGROUND

1. Field of the Invention

The present invention relates to mechanisms for accessing computer applications in a wireless environment. More specifically, the present invention relates to a method and an apparatus that provides single sign-on services that facilitate accessing computer applications from wireless computing devices.

2. Related Art

As the use of wireless devices continues to grow at an exponential rate, users of these devices are becoming increasingly frustrated with existing mechanisms for accessing computer applications located on remote application servers through these wireless devices. Some of these wireless devices, for example personal digital assistants (PDAs) and cell phones, have cumbersome interfaces for entering authentication data, such as user names and passwords.

During a particular session, a user desiring to access an application through a wireless device first establishes a connection between the wireless device and a wireless gateway. This wireless gateway subsequently acts as a proxy for the user, which allows the user to communicate with the application. In doing so, the wireless gateway performs any required transformations on the data to make it compatible with the wireless device and transmits the data to the wireless device.

When the wireless gateway first contacts the application on behalf of the user, the application typically requests authentication credentials such as a user name and a password. The wireless gateway forwards this request to the user of the wireless device who responds with the authentication credentials. The wireless gateway then forwards the credentials to the application for verification. After the user has been authenticated, the session with the application can proceed.

If at a later time within the same session, the user desires to switch to a second application, the user must repeat the same sequence of authentication operations with the second application. Additionally, the user is typically "logged out" of the first application, which means that the user must re-authenticate with the first application if the user later desires to reaccess the first application.

Hence, what is needed is a method and an apparatus that allows a user to access multiple computer applications in a wireless environment without the problems described above.

SUMMARY

One embodiment of the present invention provides a system that facilitates single sign-on services in a wireless environment. The system operates by receiving a request at an application server from a wireless gateway to access a partner application on behalf of a user. The system then determines if the wireless gateway holds a token granting access to the partner application on behalf of the user. If the wireless gateway does not hold the token, the system redirects the request to a single sign-on server. The single sign-on server then requests user authentication credentials from the user through the wireless gateway. After receiving the user authentication credentials, the single sign-on server determines if the user is authorized to access the partner application. If so, the single sign-on server issues a token to the wireless gateway. This token grants wireless gateway access to the partner application on behalf of the user.

In a variation of this embodiment, the partner application is one of a plurality of partner applications, and the token grants access to other applications in the plurality of partner applications.

In a further variation, the system allows an administrator to establish the plurality of partner applications.

In a further variation, the administrator establishes the plurality of partner applications based on the user authentication credential.

In a further variation, the system encrypts the token issued to the wireless gateway to protect the token from tampering.

In a further variation, the system encrypts the user authentication credential while the user authentication credential is in transit across a network.

In a further variation, the system establishes a wireless session between a user device and the wireless gateway, whereby the user can access the partner application and receive output from the partner application.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Wireless Devices

Figure 1:
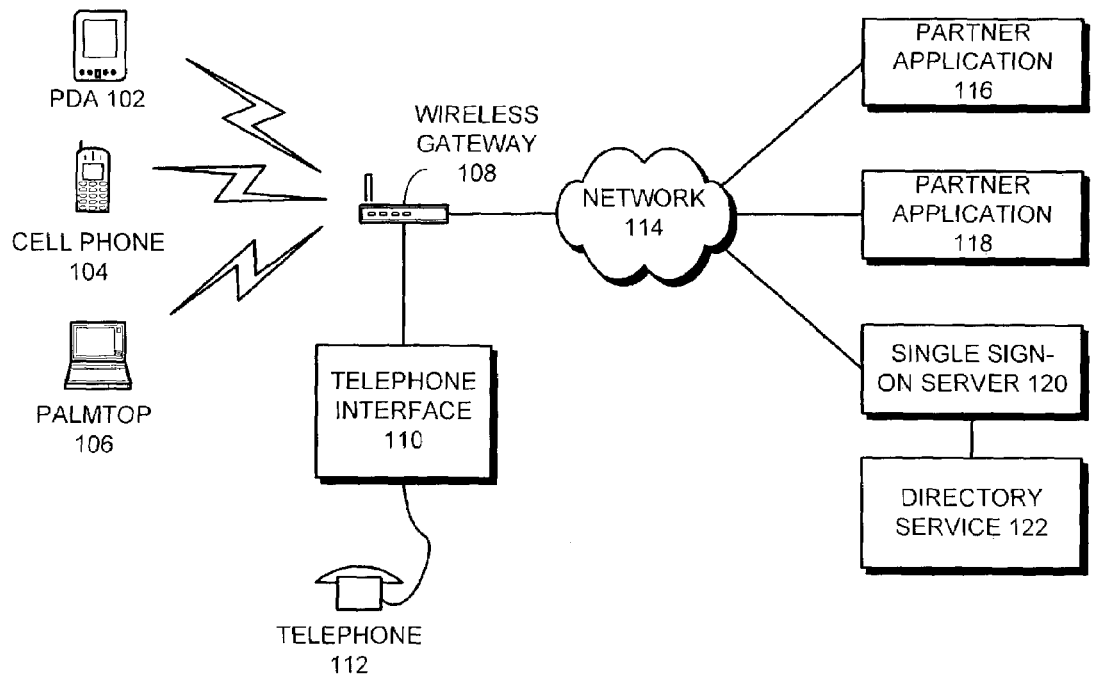
FIG. 1 illustrates wireless devices coupled to applications in accordance with an embodiment of the present invention.

FIG. 1 illustrates wireless devices coupled to applications in accordance with an embodiment of the present invention. The system includes wireless devices such as personal digital assistant (PDA) 102, cell phone 104, and palmtop 106 coupled to wireless gateway 108. Note that these wireless devices are presented for purposes of illustration only, and that the system can generally include more or fewer wireless devices of differing varieties. Telephone 112 is coupled to wireless gateway 108 through telephone interface 110. Wireless gateway 108 also communicates with to partner applications 116 and 118, and single sign-on server 120 through network 114. Single sign-on server 120 additionally communicates with directory service 122 for purposes determine user authentications. Note that partner applications 116 and 118 and single sign-on server 120 can be hosted in separate server devices or, alternatively, can be hosted as separate processes within a single server device.

Network 114 provides communication paths between wireless gateway 108, partner applications 116 and 118, and single sign-on server 120. Network 114 can generally include any type of wire or wireless communication channel capable of coupling together computing nodes. This includes, but is not limited to, a local area network, a wide area network, or a combination of networks. In one embodiment of the present invention, network 114 includes the Internet.

Wireless gateway 108 establishes sessions with one or more wireless devices and acts as a proxy for the user of the wireless devices to partner applications 116 and 118. Note that there can be more partner applications than shown in FIG. 1. Wireless gateway 108 can also establish voice sessions with telephone 112 across telephone interface 110. This allows wireless gateway 108 to act as a proxy to partner application 116 and 118 on behalf of a user of telephone 112.

Partner applications 116 and 118 provide services to users of PDA 102, cell phone 104, palmtop 106, and telephone 112. Before doing so, partner applications 116 and 118 receive user authentication information from single sign-on server 120.

During operation, a user establishes a session between a wireless device, such as PDA 102, and wireless gateway 108. The user then attempts to access a partner application, say partner application 118, across network 114. During this process, wireless gateway 108 acts as a proxy for the user and forwards the access request to partner application 118. In response, partner application 118 determines if wireless gateway 108 holds a token, which authorizes wireless gateway 108 to access partner application 118 on behalf of the user. If not, partner application 118 reroutes the request to single sign-on server 120 for authentication.

If the request is re-routed, single sign-on server 120 requests authentication credentials from wireless gateway 108. Wireless gateway 108, in turn, passes the request to PDA 102. After the user enters the authentication credentials into PDA 102, PDA 102 returns the authentication credentials to single sign-on server 120 for authentication. Single sign-on server 120 then verifies the authentication credentials using data from directory service 122. In one embodiment of the present invention, directory service 122 is a lightweight directory access protocol (LDAP) device, which stores the authentication credentials. These authentication credentials can include a user name and password, or other suitable authentication data such as a personal identification number (PIN) that is entered from a telephone keypad or vocally.

After the authentication credentials have been verified, single sign-on server 120 issues a time stamped token to wireless gateway 108, which grants access to partner applications 116 and 118 and any other partner applications within the system. Wireless gateway 108 then provides this token to partner application 118 for authentication. When the token is available, partner application 118 allows wireless gateway 108 to become a proxy for the user at PDA 102. Each time the user accesses partner application 118, wireless gateway 108 provides the token to partner application 118. Partner application 118 updates the time stamp within the token and returns the token to wireless gateway 108. Updating this time stamp allows partner application 118 to determine if sufficient time has elapsed for a "timeout" to occur. If a timeout has occurred, partner application 118 redirects any requests from wireless gateway 108 on behalf of the user to single sign-on server 120 for reauthentication.

After the token has been issued but before the timeout period has expired, if wireless gateway 108 attempts to access another partner application, such as partner application 116, this other partner application 116 can retrieve the token from wireless gateway 108. If the time stamp indicates that the token has not expired, partner application 116 grants access without further authorization. Partner application 116 also updates the time stamp so that as long as the user continues to access partner applications, the token remains valid.

Wireless gateway 108 and telephone interface 110 provide access to partner applications 116 and 118 from telephone 112. The user input from telephone 112 can be dual-tone, multi-frequency (DTMF) inputs or can be voice inputs. Wireless gateway 108 provides the necessary translations between voice and DTMF inputs from telephone 112 and partner applications 116 and 118. Wireless gateway 108 also converts signals from partner applications 116 and 118 to voice signals for the user at telephone 112. Note that the user may provide authentication credentials in several formats. For example, the authentication credentials can include a user name and password, a user PIN, or a combination of either of these credentials plus an additional password. In the latter case, the user can access a first level of data with the first credential and a second, more secure, level of data with the additional password.

Wireless Gateway

Figure 2:
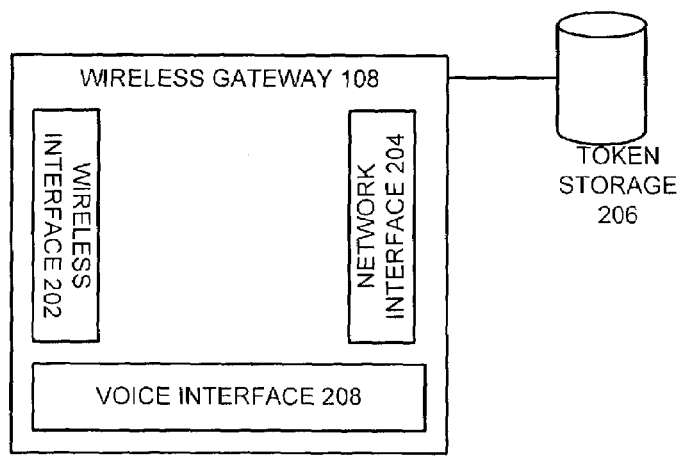
FIG. 2 illustrates wireless gateway 108 in accordance with an embodiment of the present invention.

FIG. 2 illustrates wireless gateway 108 in accordance with an embodiment of the present invention. Wireless gateway 108 includes wireless interface 202, network interface 204, token storage 206, and voice interface 208.

Wireless interface 202 provides a mechanism for establishing wireless sessions between wireless gateway 108 and the various wireless devices such as PDA 102, cell phone 104, and palmtop 106. The wireless protocols used between wireless gateway 108 and the various wireless devices are well known in the art and will not be described further herein.

Network interface 204 couples wireless gateway 108 to partner applications 116 and 118 across network 114. The network protocols used on these networks, such as TCP/IP, are well know in the art and will not be described further herein.

Token storage 206 provides storage for tokens issued by single sign-on server 120 on behalf of users. These tokens are used as described above. Note that the tokens are typically encrypted to prevent tampering at wireless gateway 108.

Voice interface 208 provides vocalizations of data from partner applications 116 and 118 to telephone interface 110 for the user at telephone 112. Voice interface 208 also provides translations from voice to digital signals for a limited range of voice commands from the user at telephone 112.

Partner Application

Figure 3:
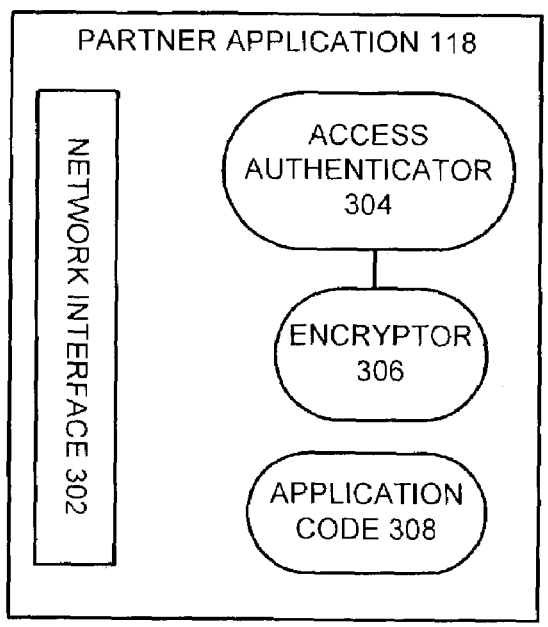
FIG. 3 illustrates partner application 118 in accordance with an embodiment of the present invention.

FIG. 3 illustrates partner application 118 in accordance with an embodiment of the present invention. Partner application 118 is typical of each partner application within the system and, therefore, will be the only partner application described. Partner application 118 includes network interface 302, access authenticator 304, encryptor 306, and application code 308. Network interface 302 provides access to partner application 118 over network 114 and provides access by partner application 118 to entities on network 114.

Access authenticator 304 determines whether wireless gateway 108 holds a current token to access partner application 118 on behalf of the user. If so, the time stamp within the token is updated and wireless gateway 108 is granted access to partner application 118. Otherwise, access authenticator 304 redirects the incoming request for access to single sign-on server 120 for authorization.

Encryptor 306 provides encryption and decryption capabilities to access authenticator 304. The tokens are stored at wireless gateway 108 in an encrypted form, thereby requiring the token to be decrypted by encryptor 306 during authentication. After authentication, access authenticator 304 updates the time stamp within the token and encryptor 306 encrypts the token before returning it to wireless gateway 108.

Application code 308 provides services from partner application 18 to the user through wireless gateway 108. Wireless gateway 108 uses a mobile extensible markup language (XML) to communicate with partner application 118.

Single Sign-on Server

Figure 4:
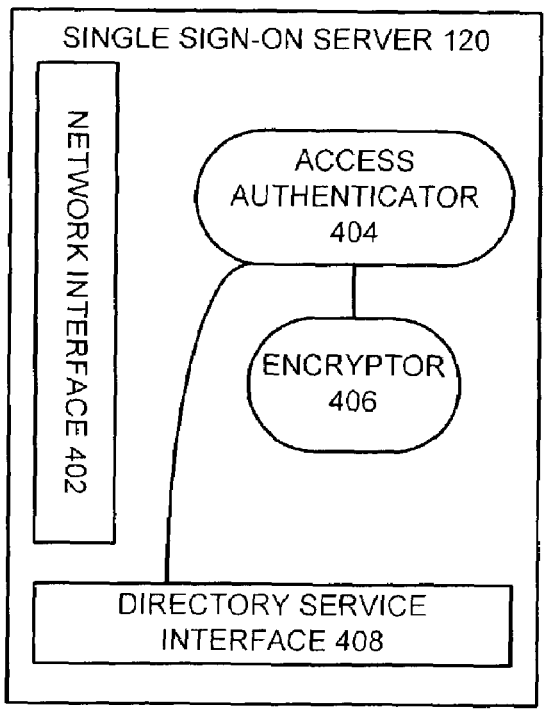
FIG. 4 illustrates single sign-on server 120 in accordance with an embodiment of the present invention.

FIG. 4 illustrates single sign-on server 120 in accordance with an embodiment of the present invention. Single sign-on server 120 includes network interface 402, access authenticator 404, encryptor 406, and directory service interface 408.

Network interface 402 provides access to single sign-on server 120 over network 114 and provides access by single sign-on server 120 to entities on network 114.

Access authenticator 404 receives redirected access requests from wireless gateway 108 on behalf of a user of a wireless device such as PDA 102. In response, access authenticator 404 requests authentication credentials from the user. Upon receipt of the authentication credentials, access authenticator 404 accesses directory service 122 using directory service interface 408 to verify the authentication credentials provided by the user. If the authentication credentials are valid, access authenticator 404 provides a token to wireless gateway 108, thereby authorizing wireless gateway 108 to access partner applications 116 and 118 on behalf of the user.

Encryptor 406 provides decryption for the authentication credentials that are received from the user in an encrypted form for transmission over network 114 and the wireless network. Encryptor 406 also provides encryption for the token to prevent tampering at wireless gateway 108 or during transmission across network 114.

Directory service interface 408 provides access to the LDAP directory service 122. LDAP is well known in the arts and will not be described further herein. An administrator provides the entries within directory service 122 setting valid authentication credentials and user access profiles.

User Authentication

Figure 5:
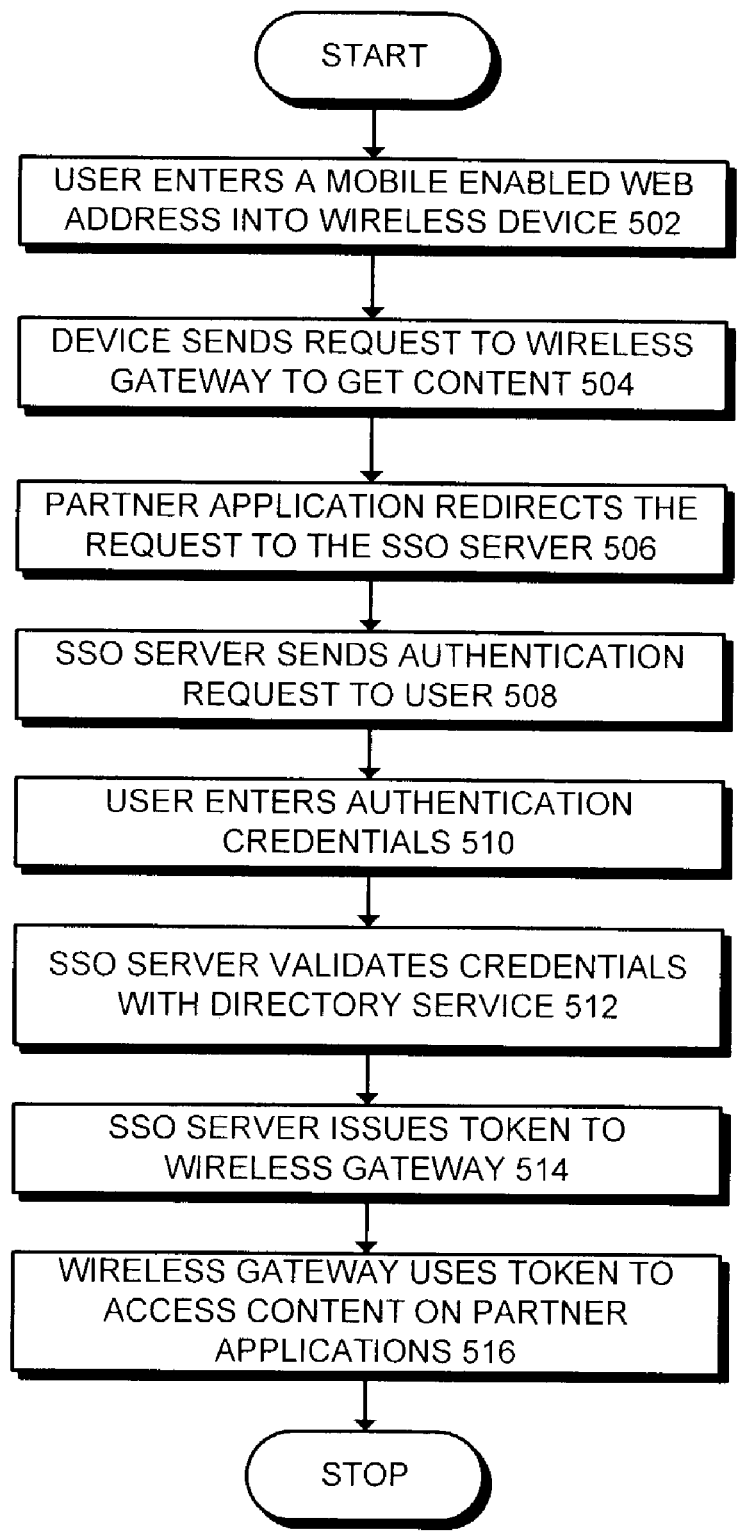
FIG. 5 presents a flowchart illustrating the process of a user authenticating with partner applications through a wireless gateway in accordance with an embodiment of the present invention.

FIG. 5 is a flowchart illustrating the process of a user authenticating with partner applications through a wireless gateway in accordance with an embodiment of the present invention. The system starts when a user enters a mobile enabled web address into a wireless device such as PDA 102 (step 502). PDA 102 then sends a request to wireless gateway 108 to get the content at the web address, say partner application 118 (step 504). Upon determining that wireless gateway 108 does not possess a token to access partner application 118 on behalf of the user, partner application 118 redirects the request to single sign-on server 120 (step 506).

In response to the redirected request, single sign-on server 120 sends a request to the user for authentication credentials such as a user name and password (step 508). The user then enters the authentication credentials into PDA 102 and returns them to single sign-on server 120 via wireless gateway 108 (step 510).

Single sign-on server 120 validates the received authentication credentials with directory service 122 (step 512). If the authentication credentials are valid, single sign-on server 120 issues a token to wireless gateway 108 granting authority for wireless gateway 108 to access partner application 118 and related partner applications on behalf of the user (step 514). Finally, wireless gateway 108 uses the token to access the content of partner application 118 on behalf of the user (step 506).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate single sign-on services in a wireless environment, comprising:

receiving a request at an application server from a wireless gateway on behalf of a user to access a partner application within a set of partner applications in the wireless environment on the application server;

determining if the wireless gateway holds a token granting access to the partner application on behalf of the user; and if the wireless gateway does not hold the token,
   redirecting the request to a single sign-on server,
   requesting a user authentication credential from the user through the wireless gateway,
   receiving the user authentication credential,
   verifying if the user is authorized to access the partner application based on the user authentication credential, and
   if the user is authorized to access the partner application, issuing the token to the wireless gateway, wherein the token grants access to the partner application by the wireless gateway on behalf of the user;

otherwise, if the current time is earlier than a time stamp within the token:
   granting access to the partner application, and
   updating the time stamp within the token by the partner application, wherein if a second partner application within the set of partner applications updates the time stamp within the token, the wireless gateway can continue to grant access on behalf of the user to the set of partner applications in the wireless environment, and wherein if the current time is earlier than the time stamp within the token, the token can be used to access the partner application prior to updating the time stamp within the token.

2. The method of claim 1,
wherein the partner application is one of a plurality of partner applications; and wherein the token can grant access to another application in the plurality of partner applications.

3. The method of claim 2, further comprising allowing an administrator to establish the plurality of partner applications.

4. The method of claim 3, wherein the administrator establishes the plurality of partner applications based on the user authentication credential.

5. The method of claim 1, further comprising encrypting the token issued to the wireless gateway to protect the token from tampering.

6. The method of claim 1, further comprising encrypting the user authentication credential during transit across a network.

7. The method of claim 1, further comprising establishing a wireless session between a user device and the wireless gateway, whereby the user can access the partner application and receive output from the partner application.

8. A computer-readable storage medium storing instructions that when executed by a computer cause the computer to perform a method to facilitate single sign-on services in a wireless environment, the method comprising:
receiving a request at an application server from a wireless gateway on behalf of a user to access a partner application within a set of partner applications in the wireless environment on the application server;
determining if the wireless gateway holds a token granting access to the partner application on behalf of the user; and
if the wireless gateway does not hold the token,
  redirecting the request to a single sign-on server,
  requesting a user authentication credential from the user through the wireless gateway,
  receiving the user authentication credential,
  verifying if the user is authorized to access the partner application based on the user authentication credential, and
  if the user is authorized to access the partner application, issuing the token to the wireless gateway, wherein the token grants access to the partner application by the wireless gateway on behalf of the user;
otherwise, if the current time is earlier than a time stamp within the token:
  granting access to the partner application, and
  updating the time stamp within the token by the partner application, wherein if a second partner application within the set of partner applications updates the time stamp within the token, the wireless gateway can continue to grant access on behalf of the user to the set of partner applications in the wireless environment, and wherein if the current time is earlier than the time stamp within the token, the token can be used to access the partner application prior to updating the time stamp within the token.

9. The computer-readable storage medium of claim 8, wherein the partner application is one of a plurality of partner applications; and
wherein the token can grant access to another application in the plurality of partner applications.

10. The computer-readable storage medium of claim 9, the method further comprising allowing an administrator to establish the plurality of partner applications.

11. The computer-readable storage medium of claim 10, wherein the administrator establishes the plurality of partner applications based on the user authentication credential.

12. The computer-readable storage medium of claim 8, the method further comprising encrypting the token issued to the wireless gateway to protect the token from tampering.

13. The computer-readable storage medium of claim 8, the method further comprising encrypting the user authentication credential during transit across a network.

14. The computer-readable storage medium of claim 8, the method further comprising establishing a wireless session between a user device and the wireless gateway, whereby the user can access the partner application and receive output from the partner application.

15. An apparatus to facilitate single sign-on services in a wireless environment, comprising:
a receiving mechanism that is configured to receive a request at an application server from a wireless gateway on behalf of a user to access a partner application within a set of partner applications in the wireless environment on the application server;
a determining mechanism that is configured to determine if the wireless gateway holds a token granting access to the partner application on behalf of the user; and
a redirecting mechanism that is configured to redirect the request to a single sign-on server;
a requesting mechanism that is configured to request a user authentication credential from the user through the wireless gateway;
wherein the receiving mechanism is further configured to receive the user authentication credential,
a verifying mechanism that is configured to verify if the user is authorized to access the partner application based on the user authentication credential;
an issuing mechanism that is configured to issue the token to the wireless gateway, wherein the token grants access to the partner application by the wireless gateway on behalf of the user, if the user is authorized to access the partner application; and
an access granting mechanism that is configured to grant access to the partner application; and
a time stamp updating mechanism that is configured to update the time stamp within the token by the partner application, wherein if a second partner application within the set of partner applications updates the time stamp within the token, the wireless gateway can continue to grant access on behalf of the user to the set of partner applications in the wireless environment, and wherein if the current time is earlier than the time stamp within the token, the token can be used to access the partner application prior to updating the time stamp within the token.

16. The apparatus of claim 15,
wherein the partner application is one of a plurality of partner applications; and
wherein the token can grant access to another application in the plurality of partner applications.

17. The apparatus of claim 16, further comprising an establishing mechanism that is configured to allow an administrator to establish the plurality of partner applications.

18. The apparatus of claim 17, wherein the administrator establishes the plurality of partner applications based on the user authentication credential.

19. The apparatus of claim 15, further comprising an encrypting mechanism that is configured to encrypt the token issued to the wireless gateway to protect the token from tampering.

20. The apparatus of claim 15, further comprising an encrypting mechanism that is configured to encrypt the user authentication credential during transit across a network.

21. The apparatus of claim 15, further comprising a session establishing mechanism that is configured to establish a wireless session between a user device and the wireless gateway, whereby the user can access the partner application and receive output from the partner application.

* * * * *

UNITED STATES PATENT AND TRADEMARK OFFICE
CERTIFICATE OF CORRECTION

PATENT NO.       : 7,340,525 B1
APPLICATION NO.  : 10/351073
DATED            : March 4, 2008
INVENTOR(S)      : Bhatia et al.

It is certified that error appears in the above-identified patent and that said Letters Patent is hereby corrected as shown below:

In column 5, line 22, delete "18" and insert -- 118 --, therefor.

Signed and Sealed this

Tenth Day of November, 2009

David J. Kappos
*Director of the United States Patent and Trademark Office*